United States Patent
Mercado et al.

(10) Patent No.: US 6,170,891 B1
(45) Date of Patent: Jan. 9, 2001

(54) CLOSURE FOR SECONDARY CONTAINMENT PIPE

(76) Inventors: Hector P. Mercado, 303 Morningside Dr.; Joie L. Folkers, 2417 Merrimac; Robert A. Baxter, 2806 Fleming, all of Wichita Falls, TX (US) 76301

( * ) Notice: Under 35 U.S.C. 154(b), the term of this patent shall be extended for 0 days.

(21) Appl. No.: 09/070,954

(22) Filed: May 1, 1998

Related U.S. Application Data

(60) Provisional application No. 60/081,343, filed on Apr. 7, 1998.

(51) Int. Cl.[7] ................................................ F16L 21/00
(52) U.S. Cl. ...................... 285/419; 285/373; 285/148.23
(58) Field of Search ................................... 285/419, 373, 285/915, 148.18, 148.23, FOR 159, 123.1, 123.15

(56) References Cited

U.S. PATENT DOCUMENTS

| | | | |
|---|---|---|---|
| 924,262 | * 6/1909 | Moll | 285/419 X |
| 1,725,713 | * 8/1929 | Jobe | 285/419 X |
| 2,173,399 | * 9/1939 | Mills | 285/419 X |
| 2,951,715 | 9/1960 | Bauer | 285/249 |
| 3,048,177 | * 8/1962 | Takaro | 285/419 X |
| 3,103,373 | 9/1963 | Lennon et al. | 285/342 |
| 3,284,114 | 11/1966 | McCord, Jr. et al. | 287/58 |
| 3,372,715 | 3/1968 | Ashton | 141/59 |
| 3,498,642 | * 3/1970 | Berger | 285/419 X |
| 3,498,647 | 3/1970 | Schroder | 285/343 |
| 3,603,912 | 9/1971 | Kelly | 339/89 C |
| 3,873,135 | * 3/1975 | Kreitzberg | 285/419 X |
| 3,895,830 | * 7/1975 | Madlem | 285/419 X |
| 4,653,782 | * 3/1987 | Munday | 285/373 |
| 4,667,505 | 5/1987 | Sharp | 73/40.5 R |
| 4,896,902 | * 1/1990 | Weston | 285/373 X |
| 5,343,738 | 9/1994 | Skaggs | 73/40.5 R |
| 5,547,231 | 8/1996 | Sharp | 285/133.1 |
| 5,654,499 | 8/1997 | Manuli | 73/40.5 R |
| 5,853,200 | * 12/1998 | Zieres | 285/419 X |

FOREIGN PATENT DOCUMENTS 96 09487    3/1996   (WO) .

* cited by examiner

Primary Examiner—Lynne H. Browne
Assistant Examiner—David E. Bochna
(74) Attorney, Agent, or Firm—Christie, Parker & Hale, LLP

(57) ABSTRACT

A fitting assembly for joining a double containment pipe (DCP), including primary and secondary pipes, to a double containment fitting, including primary and secondary fittings, wherein the secondary fitting has a larger diameter than the secondary pipe. A sealing reducer has a larger diameter end for fitting over the secondary fitting and a smaller diameter end for fitting over the secondary pipe. The sealing reducer is fit over the secondary pipe, the primaries of the DCP and double containment fitting are joined, and then the sealing reducer is positioned over the primary joint and its smaller and larger diameter ends sealed, either by adhesive or a combination of interlocking threaded fitting components and O-rings, to the ends of the secondary pipe and secondary fitting, respectively.

8 Claims, 9 Drawing Sheets

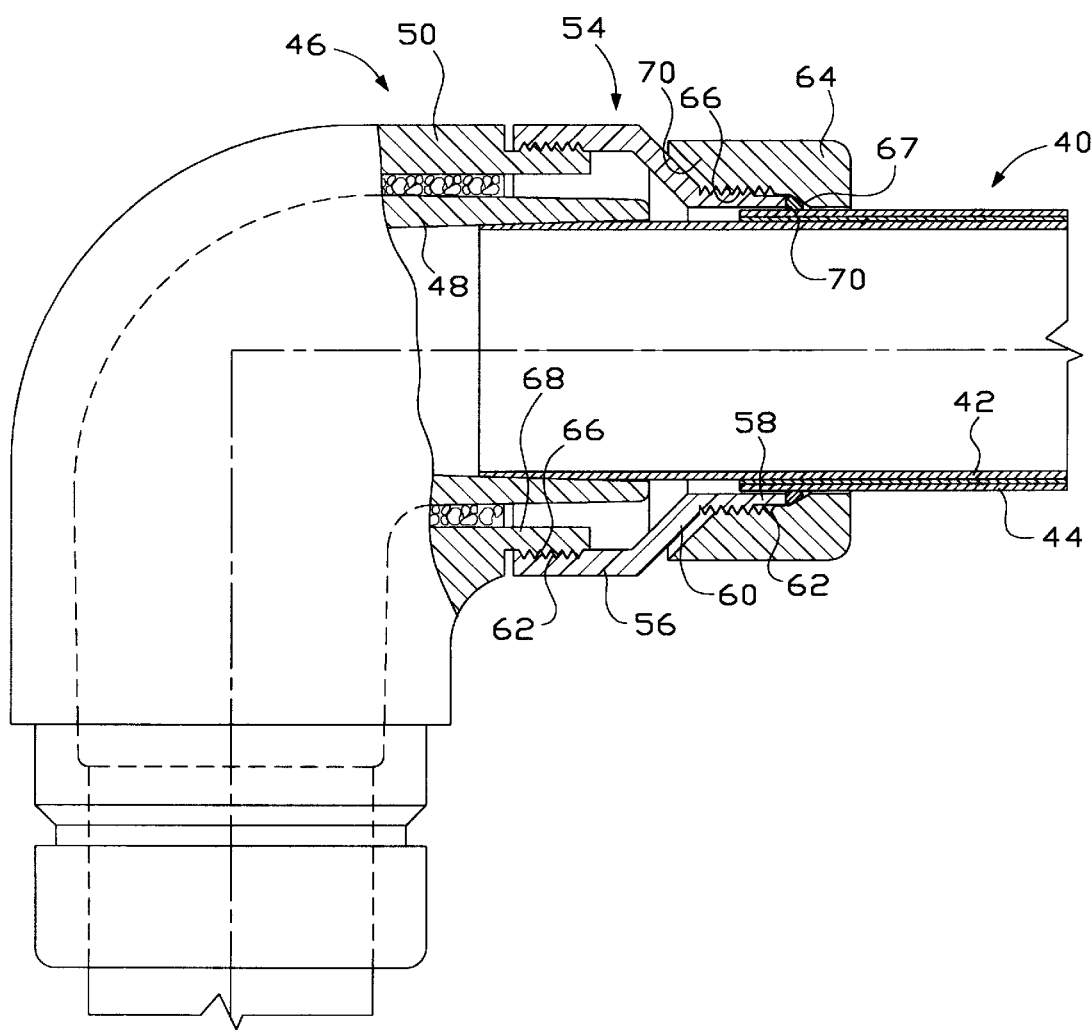

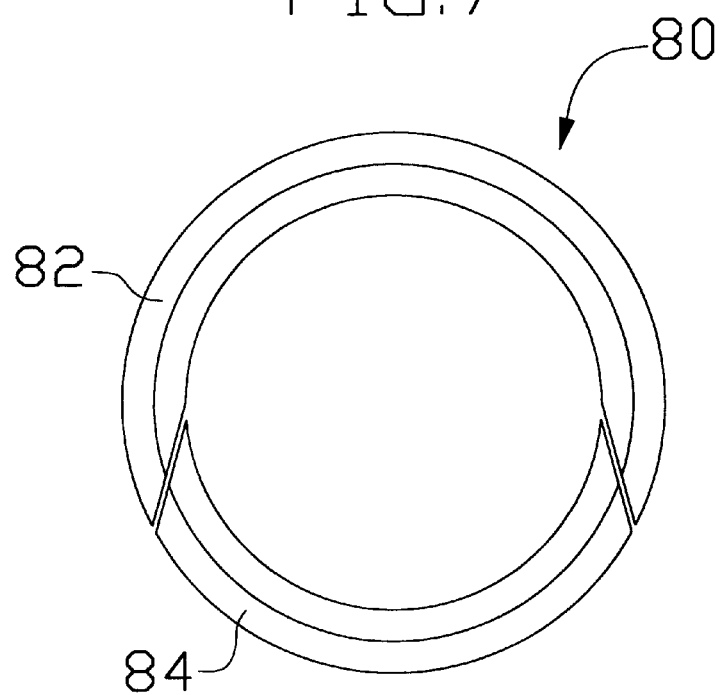
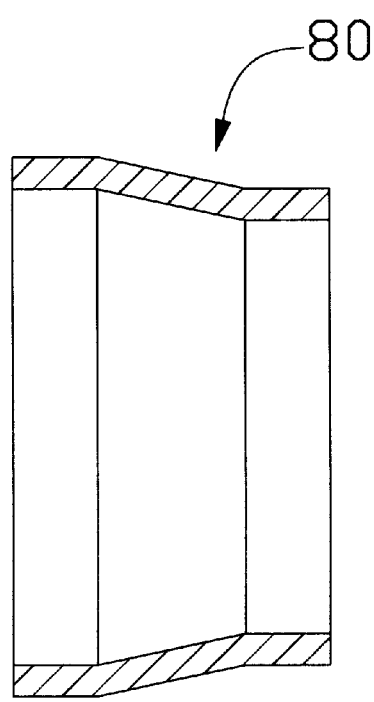

CLOSURE FOR SECONDARY CONTAINMENT PIPE

CROSS-REFERENCE TO RELATED APPLICATION

This application claims priority of the provisional U.S. patent application 60/081,343 filed Apr. 7, 1998, the subject matter of which is fully incorporated herein.

BACKGROUND

Current legislation requires the use of contained piping systems when transporting contaminants underground. This legislation is particularly applicable to the fuel-handling market. Fuel, e.g., gasoline, is stored underground in tanks and is then piped to overground fuel pumps. To prevent contamination of the surrounding ground, the legislation requires that a secondary pipe, also referred to as merely a "secondary," is used to encase the main pipe and contain any leakage from the main pipe, also referred to as the "primary." As a result, since the tank is a low point in the system, any leakage contained in the second pipe flows, due to gravity, back to the tank. Such systems are sometimes referred to as dual containment systems.

This legislation has given rise to the need for a secondary piping system which is easy to install and economical. A substantial portion of the cost of these systems is driven by the technique used to join the secondary pipes forming the containment system.

In an assembly of contained piping, it is desired, and often required, that the primary connection be visible during an initial pressure test of the system to insure integrity at test pressures. Typically, the secondary is designed with a gap over the points where the primary is joined to allow inspection of the joint under test pressures. Closure of this gap can become difficult depending on the intended service and system design. Usually this gap is closed with a two-piece fitting ("clam-shell" design) such as by manufacturing the secondary fitting element in two length-wise elements, i.e., split longitudinally into equal halves. However, the junction between the two halves create a low strength point which usually will not perform to the level of the rest of the system. Even though the secondaries are usually rated for low pressures, there are occasions in which the secondary is required to be rated at the same pressure as the primary. The joining methods to resist pressures at primary ratings are costly.

It is therefore desirable to provide a cost effective and high strength technique for closing the secondary at the joints which is capable of operating under the same pressures as the primary.

SUMMARY

According to one embodiment of the invention, a double containment pipe connection is provided which includes an inner primary pipe and an outer secondary pipe with a fluid passage between the pipes, a fitting including an inner tube and an outer tube with a fluid passage between the tubes, an intermediate diameter portion adjacent to the end of the outer tube of the fitting having a diameter intermediate between the inside diameter and the outside diameter of the outer tube, and a sealing reducer. The sealing reducer includes a smaller diameter end having an inside diameter sufficiently larger than the outside diameter of the outer secondary pipe to slide over the outside of the outer secondary pipe, and a larger diameter end having an inside diameter sufficiently larger than the outside diameter of the inner tube to permit fluid flow therebetween. A first seal is provided between the smaller diameter end of the reducer and the outside of the outer secondary pipe, and a second seal is provided between the larger diameter end of the reducer and the intermediate diameter portion of outer tube of the fitting.

According another embodiment, the intermediate diameter portion includes a thread on an inside surface of outer tube, and the second seal includes an elastomeric ring having an inside diameter sufficiently larger than the outside diameter of the inner tube to permit fluid flow therebetween, and a thread is provided on the reducer for compressing the second seal between the reducer and the second tube.

According to another embodiment, the intermediate diameter portion is a cylindrical surface on the outer tube, and the second seal is provided by an adhesive cement between the intermediate diameter portion and the larger diameter end of the reducer. Preferably, a split ring or a pair of 180° wedges are positioned around the annular lip of the secondary pipe and adhered to the secondary pipe with an adhesive cement.

According to another embodiment, a sealing fitting for use in a double containment connection is provided which includes two complementary semi-annular portions which fit together to form an annular fitting having a smaller diameter end and a larger diameter end, each semi-annular portion having at each end a substantially flat mating surface extending from an inner to an outer surface of the semi-annular portion at an acute angle to tangent to the inside diameter of the semi-annular portion.

According to another embodiment, a sealing fitting for use in a double containment connection is provided which includes first and second complementary semi-annular portions which fit together to form an annular fitting having a smaller diameter end and a larger diameter end, each semi-annular portion having at each end a mating surface including a tongue and a groove, wherein each tongue on the first semi-annular portion is adapted to fit closely in a corresponding groove on the second semi-annular portion, and wherein each tongue on the second semi-annular portion is adapted to fit closely in a corresponding groove on the first semi-annular portion.

BRIEF DESCRIPTION OF THE DRAWINGS

The foregoing features and advantages of the invention will be better understood by referring to the following drawings.

Figure 4:
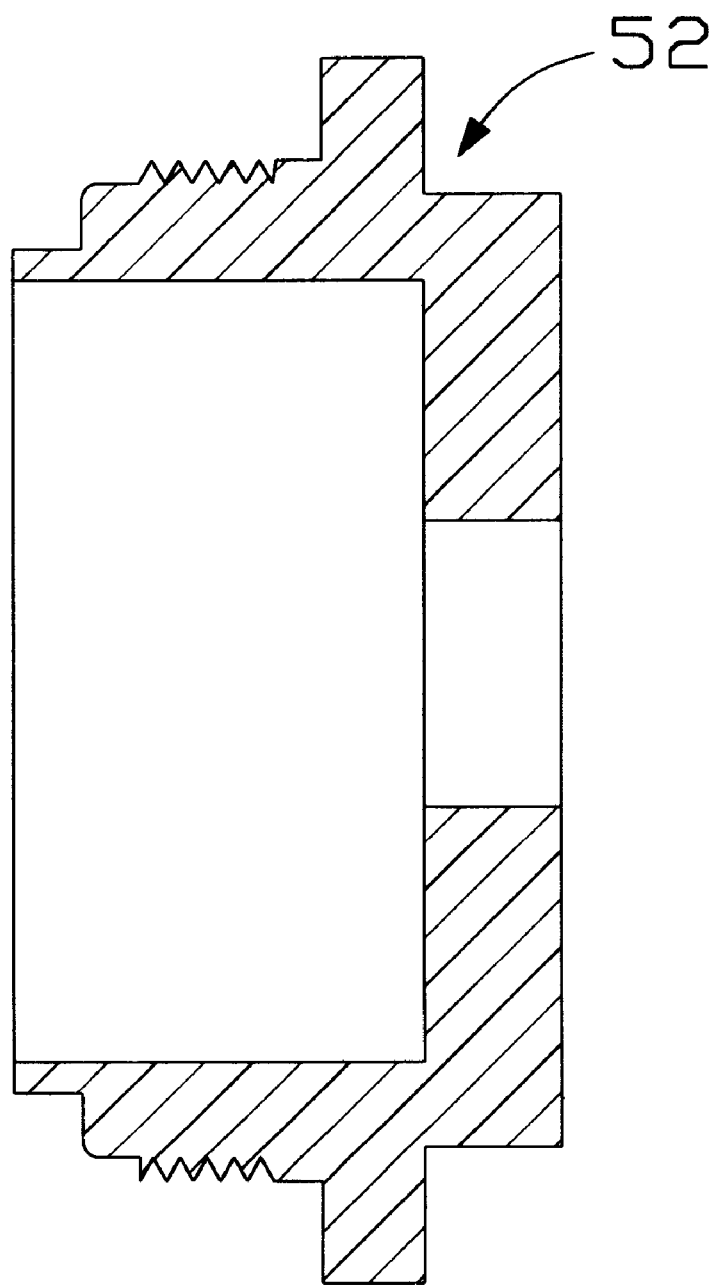
Figure 5:
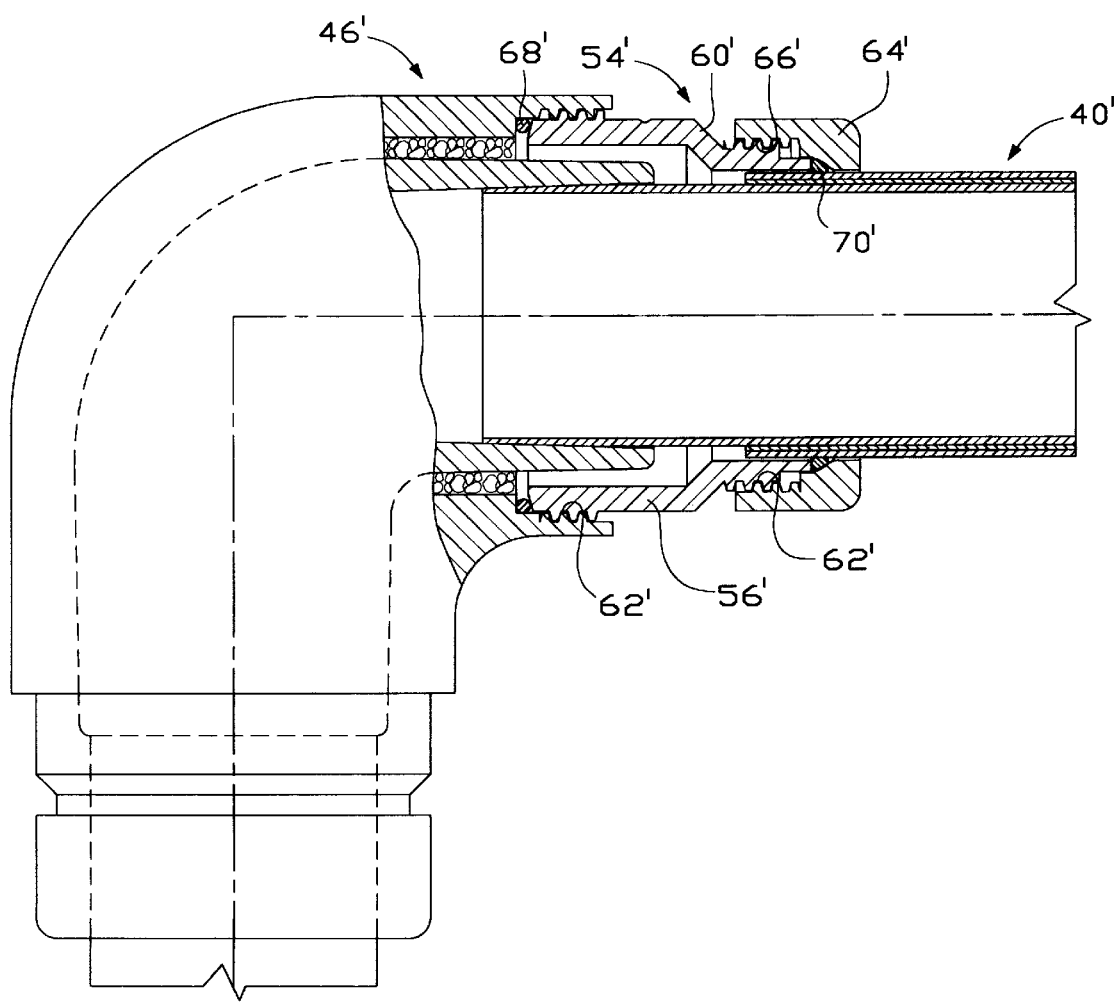
Figure 9:
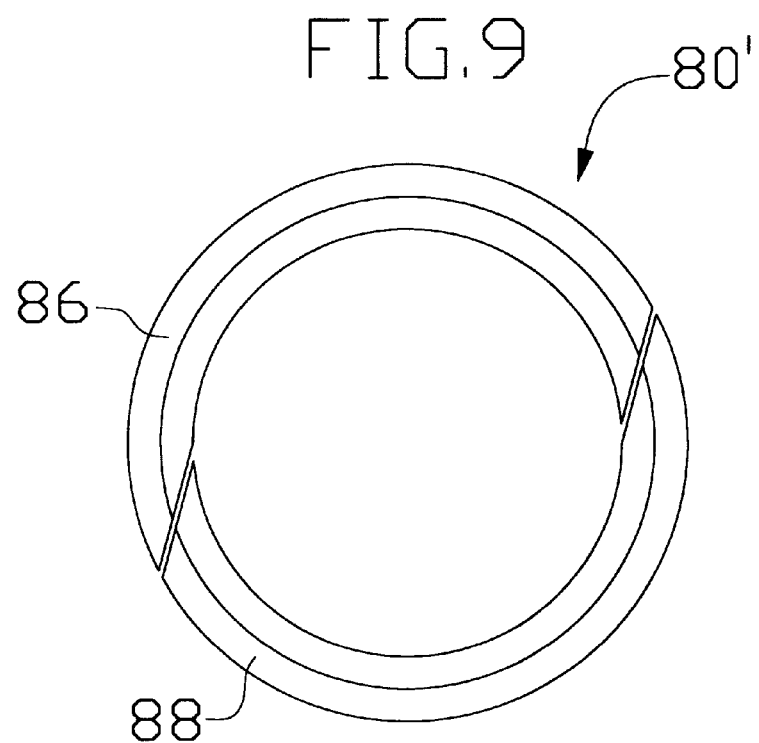
Figure 10:
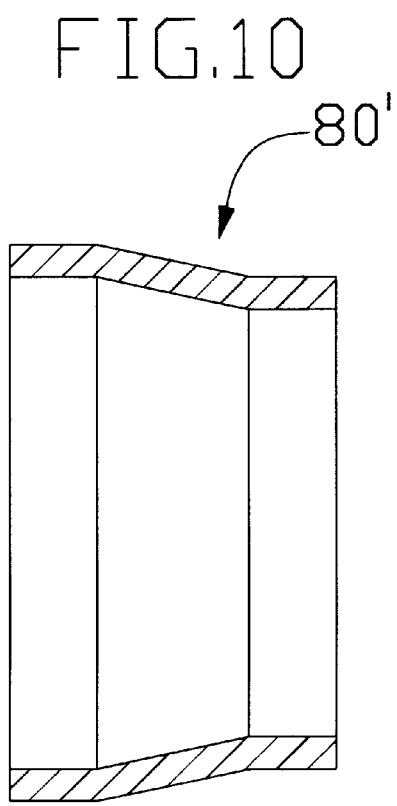
Figure 11:
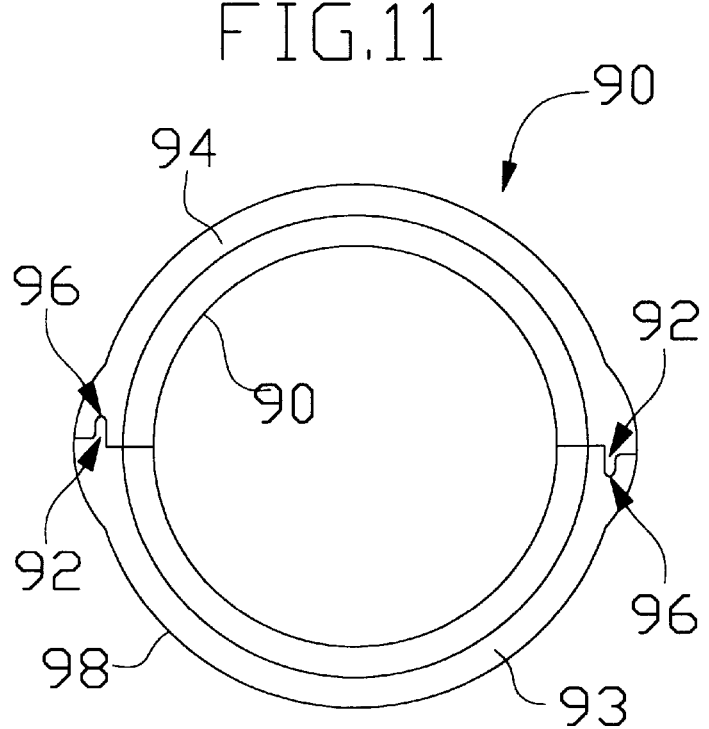
Figure 12:
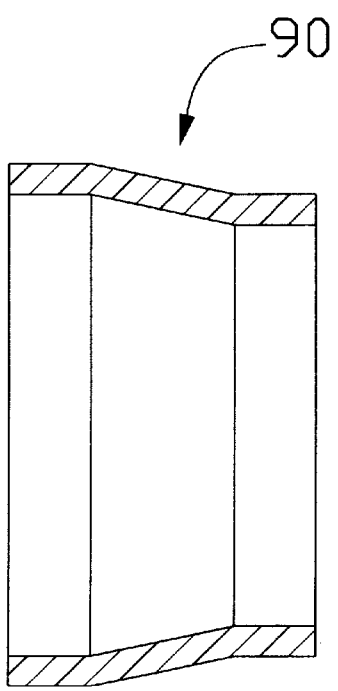

FIR 3 is a sectional view of a double containment pipe joint using a threaded single piece reducer fitting according to another embodiment of the invention;

FIG. 4 is a sectional view of a die for molding the threads of the secondary fitting of the double containment fitting;

FIG. 5 is a sectional view of a double containment pipe joint using a threaded single piece reducer fitting according to yet another embodiment of the invention;

FIG. 6 is a sectional view of a double containment pipe joint using a threaded single piece reducer fitting according to a further embodiment of the invention;

FIG. 7 is a plan view of a two piece reducer fitting according to another embodiment of the invention;

FIG. 8 is a sectional view of the reducer fitting of FIG. 6;

FIG. 9 is a plan view of a two piece reducer fitting according to yet another embodiment of the invention;

FIG. 10 is a sectional view of the reducer fitting of FIG. 9;

FIG. 11 is a plan view of a two piece reducer fitting according to another embodiment of the invention; and FIG. 12 is a sectional view of the reducer fitting of FIG. 11.

DETAILED DESCRIPTION

Figure 1:
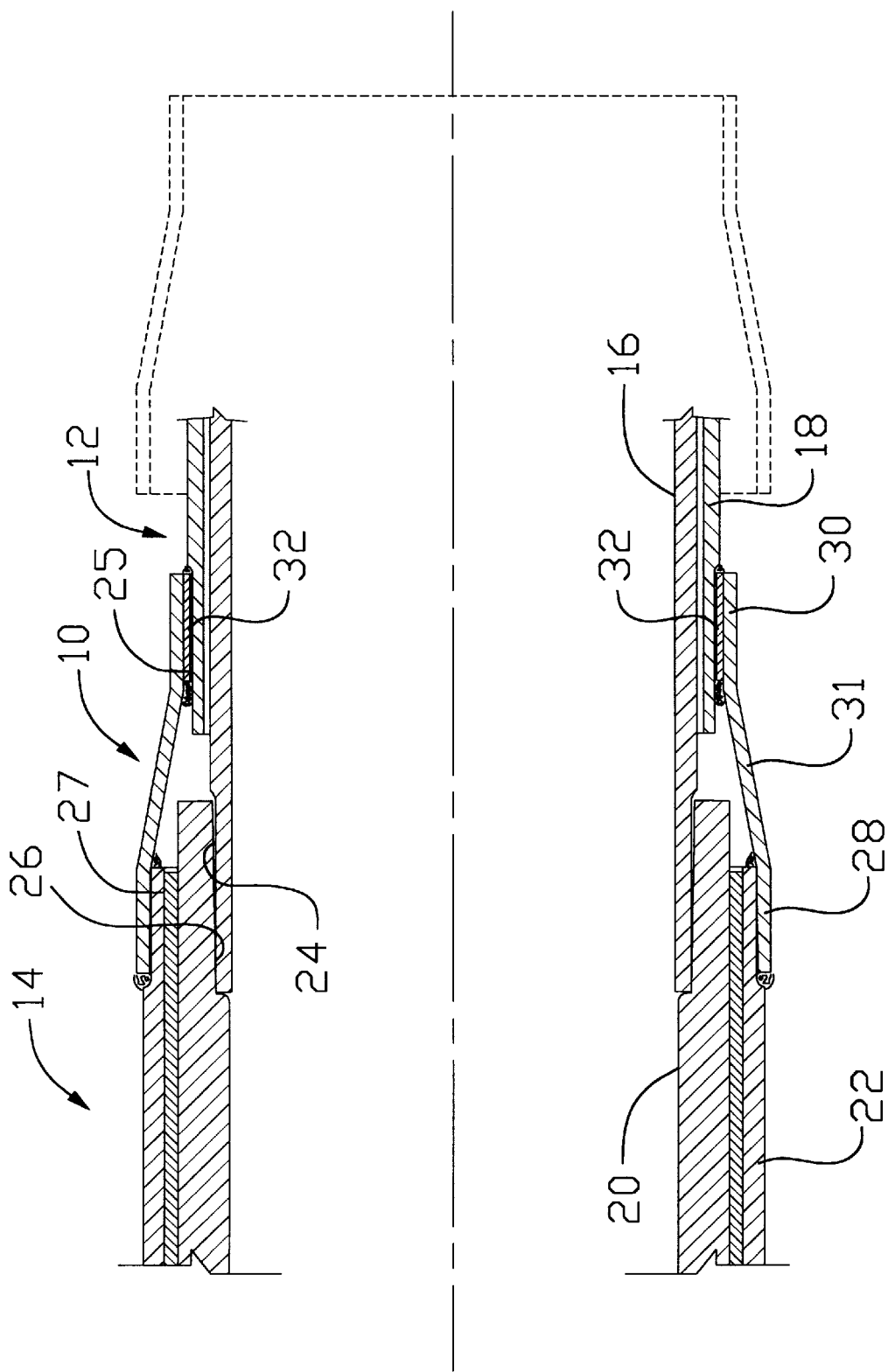
FIG. 1 is a sectional view of a double containment pipe joint using a single piece reducer fitting in combination with a split ring according to one embodiment of the invention.

FIG. 1 illustrates one embodiment of the invention in which a reducer fitting 10 is provided for joining and sealing a double containment pipe 12 ("DCP") in a double containment fitting 14. The DCP 12 consists of an internal, primary pipe 16, or simply a "primary," contained in a secondary pipe 18, or "secondary." The primary and secondary are separated by porous material which provides a fluid passage between the pipes to allow any fluid escaping from the primary to flow between the pipes into a reservoir. The porous material may be a granular material such as sand or graded gravel, or a mesh material such as copper mesh. The double containment fitting 14 consists of two tubes; a primary fitting 20 and a secondary fitting 22 which are also separated by porous material to provide a fluid passage between the tubes. The DCP 12 and the double containment fitting 14 have approximately the same inner diameter, but the double containment fitting has a larger outer diameter than the DCP.

The primary pipe 16 and primary fitting 20 have mating end structures. The male end, or spigot 24, or the primary pipe 16 is adapted to slide into the female end, or socket 26, of the primary fitting 20. The secondary pipe 18 and secondary fitting 22 each have spigot ends 25, 27, respectively, recessed from the respective primary ends 24, 26. The outer diameter of the secondary fitting 22 is larger than the outer diameter of the secondary pipe 18.

The reducer fitting 10 has two female end portions, a first, larger end portion 28 adapted to fit over the secondary fitting 22, and a second, smaller end portion 30 having a smaller diameter adapted to fit over the secondary pipe 18, and a conical intermediate portion 31. The inner diameter of the first female end portion 28 is slightly larger than the outer diameter of the secondary fitting 22 at the spigot end 27, and the inner diameter of the second female end portion 30 is slightly larger than the outer diameter of the secondary pipe 18 at the spigot end 25.

According to an exemplary embodiment for joining a DCP with an outer diameter of about 5 inches and a double containment fitting with an outer diameter of about 5 ¾ inches, the reducer fitting is approximately 3 ¾ inches in length and the female end portions each having a width of about 1 ⅛ inches. The reducer fitting is about 0.125 inch thick.

To assemble the joint, the reducer fitting 10 is slid over the DCP 12 past its end, as shown in phantom in FIG. 1. A split ring 32 is placed over the DCP 12 just beyond the spigot of the secondary 18. The split ring effectively increases the diameter of the spigot to approximate that of the rest of the pipe, and is preferably about 1/16 inch thick. Preferably, the split ring has an inner diameter slightly smaller than the outer diameter of the secondary 18 spigot, thus acting with a compression force on the lip of the DCP secondary 18.

The primary joint is formed by spreading adhesive on the spigot 24 of the primary pipe 16 and the inside diameter of the socket 26 of the primary fitting 20, bringing these ends into engagement, and bonding them together. Adhesive is then spread over the spigot 25 of the secondary pipe 18 and the split ring 32 is clamped over the spigot. The adhesive at the primary joints and the split ring is then cured. Adhesive is then spread over the split ring 32 and secondary fitting 22 and the reducer fitting 10 is slid over the primary joint such that the larger first female end 28 fits over the spigot of the secondary fitting 22 and the smaller second female end 30 is fit over the split ring 32 on the spigot of the secondary 18. The reducer fitting joints are then cured.

Preferably, the female ends of the reducer fitting 10 are tapered ½° from their ends to their junction with the intermediate portion, as in AMERON's Quick-Lock® fittings.

Figure 2:
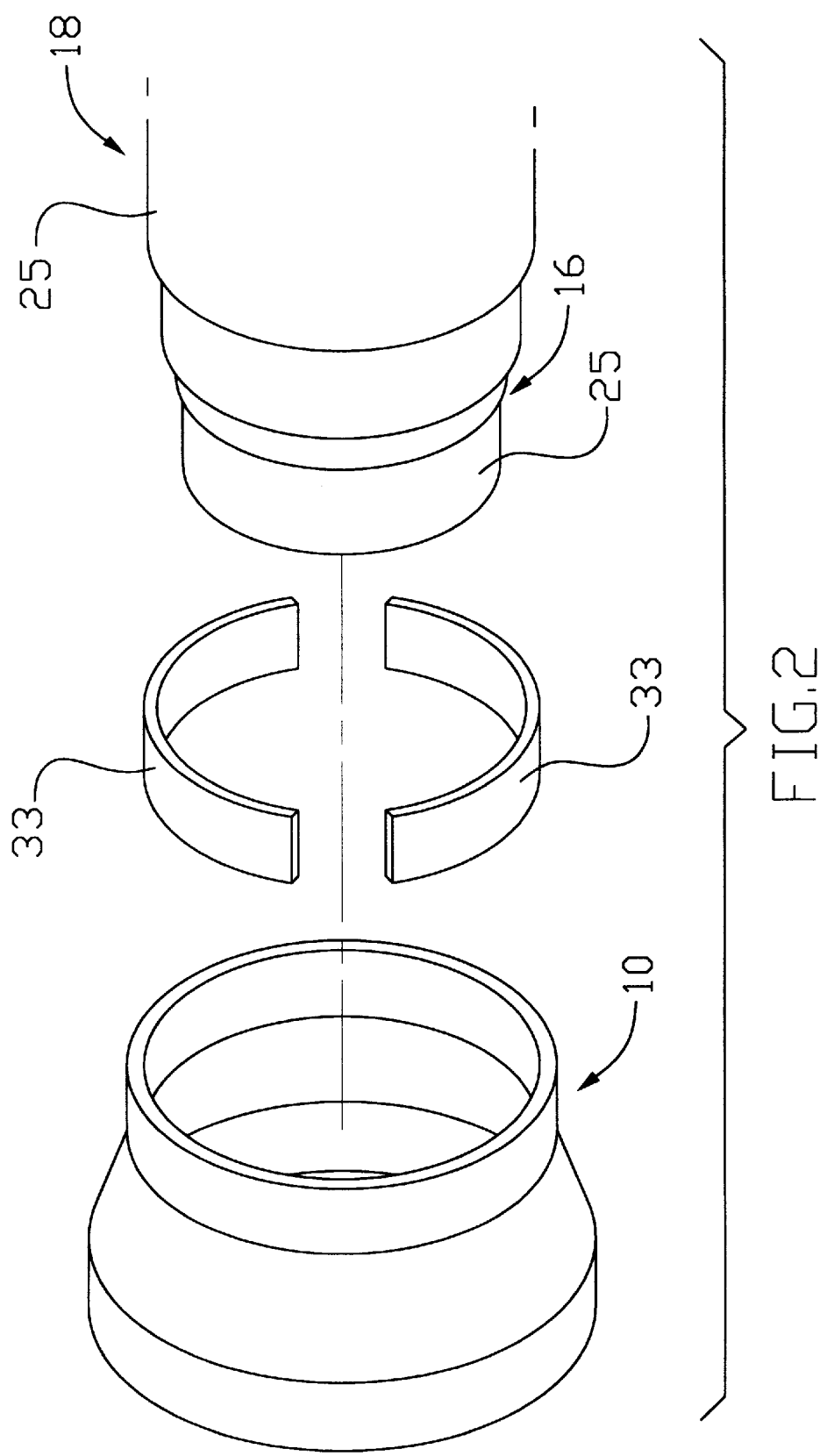
FIG. 2 is a perspective view of a single piece reducer fitting used in combination with wedges.

According to an alternate embodiment, the inner diameter of the female ends of the reducer fitting are large enough to allow two 180° wedges 33, shown in FIG. 2, to be inserted at each end while the reducer fitting is held in place at the joint, thereby eliminating the need for clamping a split ring over the spigot of the secondary pipe. Alternatively, the 180° wedges are used in place of the split ring at the spigot of the secondary 18 and only the inner diameter of the second female end 30 is increased.

Closing the secondary joint according to this embodiment provides a stronger connection which can be rated at a pressure on the order of that required for the primary.

Figure 3:
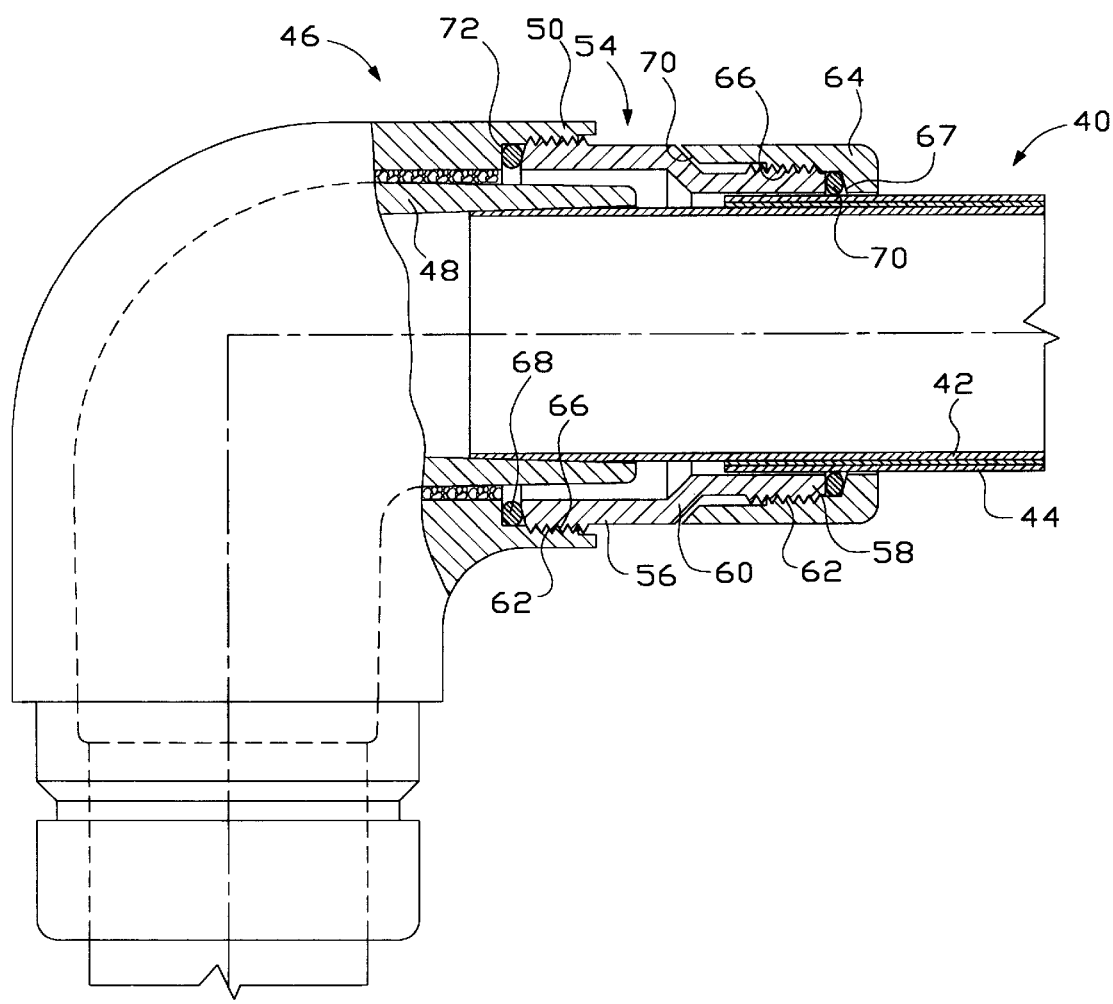

According to another embodiment shown in FIG. 3, a mechanical joint is provided consisting of elastomeric seals in combination with threaded fittings. A DCP 40 comprising a secondary pipe 44 and a primary pipe 42 with a tapered end is joined with a double containment fitting 46 comprising a primary fitting 48 and a secondary fitting 50. The double containment fitting 46 has a larger outer diameter than the DCP 40.

The primary fitting 48 is a standard molded fitting. The secondary fitting has internal threads. Preferably the internal threads are formed by molding the fitting end about a female thread die 52 as shown in FIG. 4. Porous material, such as that described above, is positioned between the primary and secondary pipes and between the primary and secondary fittings to provide a passage for fluid flow.

A reducer fitting 54 has two female end portions, a first end portion 56 having a larger diameter and a second end portion 58 having a smaller diameter, and a conical intermediate portion 60 tapering from the larger diameter to the smaller diameter, preferably at a 45° angle. Each of the female ends has external threads.

According to a preferred embodiment for joining pipes of approximately 3 inches in diameter, the threaded portion 62 of each female end of the reducer fitting 54 is 0.5 inches long with 10 turns per inch in a right-handed orientation. A nut 64 with internal threads 66 and an inner ramp 67 adjacent to the threaded portion is provided for connection to the smaller diameter female end of the reducer fitting. Preferably, two O-rings 68, 70 are used to seal the joints. A larger one of the O-rings 68 is positioned between an inner ledge 72 of the secondary fitting 50 and the end of the larger female end 56 of the reducer fitting, and the other, smaller O-ring 70 compressed between the end of the smaller diameter female end 58 of the reducer fitting, the outer diameter of the DCP secondary pipe 44, and the inner ramp of the nut 64.

To assemble the joint, the nut 64, smaller O-ring 70 and reducer fitting 54, smaller end 58 first, in that order, are slid over the secondary pipe 44. Preferably, the O-ring 70 has an inner diameter slightly smaller than the outer diameter of the DCP secondary pipe 44 to provide a snug fit. The larger O-ring 68 is positioned inside the secondary fitting 50 against the ledge 72 beyond the internal threads. The primary pipe 42 and primary fitting 48 are then joined by sliding the tapered end of the primary pipe 42 into the primary fitting 48. The larger diameter end of the reducer fitting is then screwed all the way into the mating internal threads in the secondary fitting 50, thereby compressing the O-ring 68 and providing a seal. The smaller O-ring 70 is then positioned flush against the edge of the smaller end 58 of the reducer fitting. The nut 64 is screwed over the mating outer threads of the smaller end 58 of the reducer fitting, thereby compressing the O-ring 70 between the ramp 67 of the nut, the end of the reducer fitting, and the outer diameter of the secondary pipe 44.

Preferably, the O-rings and threads are sized such that the variations in alignment of the joint can be tolerated without affecting the integrity of the seal.

Preferably, the inner ramp 67 on the nut is angled 30° and an internal bevel 74 of the nut is angled 45° to mate with the preferably 45° angle of the conical intermediate portion 60 of the reducer fitting.

The threads shown in FIG. 3 are full V-shaped threads. Preferably, the design tolerances of the mating threads are sufficiently high such that when the complementary threaded components are joined, the interconnected threaded portions act as a fluid seal. According to an alternate embodiment, the larger O-ring 68 between the larger diameter end portion 56 of the reducer fitting 54 and secondary fitting 50 is eliminated, with the seal between the threaded portions providing the fluid seal.

According to another embodiment shown in FIG. 5, an alternate thread arrangement may be used for threads on the secondary fitting, reducer fitting and nut comprising truncated V-shaped threads, commonly referred to as modified acme thread.

The embodiments of the invention described above are directed to joining the male end of a DCP to the female end of a double containment fitting. The double containment fitting could be, for example, a female end of an L-shaped or T-shaped fitting.

Generally, a DCP has a larger diameter female end with a socket and a smaller diameter male end with a spigot. According to alternate embodiments, the invention could be used to join the male end of a DCP to the female end of another DCP.

FIG. 6 illustrates an embodiment similar to that of FIG. 3, except that the larger diameter end 56" of the reducer fitting 54" is formed as a female fitting having internal threads and the end of the secondary fitting 50" is formed as a spigot with external threads. According to this embodiment, the inner diameter of the larger diameter end 56" of the reducer fitting 54" is larger than the outer diameter of the spigot of the secondary fitting 50".

According to another aspect of the invention shown in FIGS. 7–12, a two-piece reducer fitting is provided which is designed for particular ease in bonding. Some variation in diameter of the containment components and some misalignment of the joint can be tolerated due to the nature of the closure pieces of the reducer fitting and how they fit with each other.

One version of such a reducer fitting 80, 80' is a full circular closure which is cut into two pieces (82, 84 and 86, 88, respectively) in an angular orientation relative to the surface of the part, as shown in alternative embodiments illustrated in FIGS. 7 and 8, and 9 and 10. With these alternative embodiments, the area of the surfaces to be bonded is increased in comparison to known reducer fittings which are cut perpendicular to the surface (i.e., radially), leaving only the thickness of the wall of the part available for bonding. This provides greater strength for the aforementioned size and alignment deviations without significantly affecting the performance of the closure.

The semicircular pieces 82 and 84 of the embodiment shown in FIGS. 7 and 8 have substantially identical shapes and can also be produced by molding the identical pieces from the same mold.

Another version is a reducer fitting 90 consisting of two identically molded halves 91, 93 with each side having a "tongue-in-groove" configuration as shown in FIGS. 11 and 12. On one side of the fitting, a tongue 92 is positioned towards the inside wall surface 94 and a groove 96 to the outside wall surface 98, and on the other side, the groove 96 is positioned toward the inside wall surface and the tongue 92 is positioned towards the outside wall surface 98. When these two halves are assembled together, each tongue 92 and groove 96 fit in the mating surface of the opposing element in keyed engagement. Further, the tongue and groove surfaces increases the bonding surface area of the joints, thereby increasing the strength of the bond. To ensure a smooth interior surface of the fitting, it may be necessary to provide a "bulge" on the outer surface to accommodate the side of the tongue 92 and groove 96 elements necessary to provide enough surface area to provide sufficient bonding area and a good joint.

Although the present invention has been described with respect to particular embodiments, those skilled in the art will appreciate that the present invention may be modified without departing from the scope of the invention. Accordingly, all such modifications are intended to be included within the scope of the invention as defined by the following claims.

What is claimed is:

1. A sealing fitting for connecting the annulus of one double containment pipe to the annulus of another double containment pipe, comprising:

two complementary semi-annular portions adapted to fit together to form an annular fitting having a smaller diameter end and a larger diameter end, each semi-annular portion comprising:

a substantially flat mating surface extending from an inner to an outer surface of the semi-annular portion, said mating o surface extending at an acute angle to a tangent to the inside surface of the semi-annular portion as measured at the intersection of the mating surface and the inner surface, wherein the mating surface of one portion is bonded to the mating surface of the other portion forming the fitting, wherein when the fitting is formed it forms a flow conduit between the annulus of the one and the annulus of the other double containment pipe.

2. A sealing fitting for use in a double containment connection, comprising:

first and second complementary semi-annular portions which fit together to form an annular fitting having a smaller diameter end for coupling to a double containment pipe having a smaller outer surface diameter and a larger diameter end for coupling to another double containment pipe having a larger outer surface diameter, each semi-annular portion comprising at each end, a mating surface including a tongue and a mating surface including a groove complementary to the tongue, wherein each tongue on the first semi-annular portion is adapted to fit closely in a corresponding groove on the second semi-annular portion, and wherein each tongue on the second semi-annular portion is adapted to fit closely in a corresponding groove on the first semi-annular portion, wherein the two semi-annular portions can be radially fitted together to form the fitting and wherein a mating surface comprising a groove is bonded to a mating surface comprising a tongue.

3. A sealing fitting for use in connecting the annulus of one double containment pipe to the annulus of another double containment pipe, the fitting comprising two portions adapted to fit together to form an annular fitting having a smaller diameter end and a larger diameter end, each portion comprising two substantially flat mating surfaces, each mating surface extending from the smaller to the larger diameter end of the portion and from an inner to an outer surface of the portion at a non-perpendicular angle to a tangent of the inner or outer surface of the portion, wherein a first mating surface of a first portion is complementary to a first mating surface of a second portion and wherein a second mating surface of the first portion is complementary to a second mating surface of the second portion, and wherein the two portions can be radially fitted together to form the fitting and wherein the first mating surface of the first portion is mated and bonded to the first mating surface of the second portion and the second mating surface of the first portion is mated to the second mating surface of the second portion, wherein when the fitting is formed it forms a flow conduit between the annulus of the one and the annulus of the other double containment pipe.

4. A sealing fitting as recited in claim 3 wherein the first mating surface of the first portion is parallel to the second mating surface of the first portion.

5. A sealing fitting as recited in claim 3 wherein the two portions are identical.

6. A sealing fitting as recited in claim 3 wherein the first portion makes up a larger portion of the annular fitting.

7. A sealing fitting for use in connecting double containment pipes, the fitting comprising two portions adapted to fit together to form an annular fitting having a smaller diameter end and a larger diameter end, each portion comprising two mating surfaces, each mating surface extending from the smaller to the larger diameter end of the portion and from an inner to an outer surface of the portion at a non-perpendicular angle to a tangent of the inner or outer surface of the portion, wherein a first mating surface of the first portion is complementary to a first mating surface of a second portion and wherein a second mating surface of the first portion is complementary to a second mating surface of the second portion, wherein the first mating surface of the first portion comprises a tongue, wherein the first mating surface of the second portion comprises a groove complementary to the tongue, wherein the two portions can be radially fitted together to form the fitting, and wherein the first mating surface of the first portion is mated and bonded to the first mating surface of the second portion and the second mating surface of the first portion is mated to the second mating surface of the second portion.

8. A sealing fitting as recited in claim 7 wherein the second mating surface of the second portion comprises a tongue and the second mating surface of the first portion comprises a groove complementary to the tongue.

* * * * *